United States Patent Office 3,740,318
Patented June 19, 1973

3,740,318
COMPOSITION OF MATTER AND PROCESS
Bruce W. Churchill, Comstock Township, Kalamazoo County, Robert Steel, Kalamazoo, and David R. Buss, Portage, Mich., assignors to The Upjohn Company, Kalamazoo, Mich.
No Drawing. Filed Feb. 19, 1971, Ser. No. 117,056
Int. Cl. C12d 13/06
U.S. Cl. 195—65
9 Claims

ABSTRACT OF THE DISCLOSURE

A microbiological process for preparing alkaline protease using asporogenous bacteria of the genus Bacillus. This process produces protease with substantially no viable bacterial spores. The protease enzyme is useful as an additive to detergents.

BACKGROUND OF THE INVENTION

Bacterial fermentations are used extensively to prepare alkaline protease. The removal or destruction of bacterial spores in preparing protease enzymes by bacterial fermentations has been recognized as a necessary and difficult task. It is considered unwise to add large quantities of bacterial spores to detergents where they could contaminate the wash water and perhaps end up on the clothes. Present information indicates that most enzyme detergent products can contain about 10,000 spore counts/g.

By their very nature bacterial spores are extremely resistant to destruction. Methods which destroy spores also usually destroy the enzyme. Physical removal of spores is difficult to guarantee and also expensive. The following list covers most of the known ways to remove or destroy spores, along with their disadvantages.

(1) Heat—degrades enzyme before spores are reduced significantly.
(2) Oxidants such as chlorine—destroy enzyme as well as spore.
(3) Ionizing radiation such as from cobalt-60—not complete and also degrades some enzyme.
(4) Mutagenic agents such as β-propionlactone—classified as "industrial poison" and cannot be used for consumer product. Others have not worked or have degraded enzyme as well.
(5) Sterile filtration—difficult to perform as well as expensive.
(6) Ultracentrifugation—difficult to perform and uses expensive equipment.

BRIEF SUMMARY OF THE INVENTION

The subject invention relates to the discovery and use of asporogenic bacterial cultures to produce a substantially spore-free protease enzyme fermentation beer. More particularly, the subject invention comprises the cultivation of a bacterium, selected from the genus Bacillus, under controlled fermentation conditions, to produce a fermentation beer containing a high protease enzyme titer and being substantially free of viable bacterial spores. The few viable vegetative cells which may be present in the fermentation beer are easily destroyed without affecting the protease enzyme. The protease present in the fermentation beer of the subject invention can be isolated from the fermentation beer by a simpler and more efficient isolation procedure than is possible with prior art beers containing protease and bacterial spores.

DETAILED DESCRIPTION

Upon cultivating an asporogenic Bacillus in an aqueous nutrient medium under controlled conditions there is produced a fermentation beer containing the enzyme protease and no detectable viable bacterial spores. The microorganism which can be used in the process of the subject invention is selected from the genus Bacillus, which are well-known to be ubiquitous bacteria. Exemplary of species within this genus are *Bacillus subtilis, Bacillus bifidus, Bacillus cereus, Bacillus megatherium*, and the like. Although the discussion and examples following are directed to the species *Bacillus subtilis*, it is to be understood that other species of the genus Bacillus can be employed in the process of this invention. It has been found that the species *Bacillus subtilis*, being a common, non-pathogenic organism, is easy to work with and readily produces high fermentation titers of protease. For the convenience of those skilled in the art, an asporogenous subculture of *Bacillus subtilis* was deposited and can be obtained from the permanent collection of the Northern Utilization and Research Division, Agricultural Research Service, U.S. Department of Agriculture, Peoria, Ill., U.S.A. Its accession number in this repository is NRRL B-3907.

The above-mentioned culture deposit gives the following characteristics on various agar media.

| Agar medium | NRRL B-3907 |
|---|---|
| HP[1] plus 5 g./l. casein | The initial center colony was mucoid and outside ring became salmon. Mucoid sectors appeared in an irregular rosette pattern. The entire centers of original colony and sectors lysed later. |
| HP[1] plus 1 g./l. elastin | Cells very small and very motile. Sectoring extensive with reverse teardrops giving appearance of flower petals. Extensive lysis at center of colony and sectors after 3-4 days. Large zones of elastin hydrolysis. |

[1] Hanson pigmentation agar. It consists of the following:
L-tyrosine, milligram _____ 20
L-tryptophan, milligram _____ 20
MnCl₂, milligram _____ 2
MgCl₂, milligram _____ 200
FeCl₃·4H₂O, milligram _____ 35
CaCl₂, milligram _____ 200
Difco nutrient agar, grams _____ 23
Q.S. to 1 liter with distilled H₂O _____
Adjust pH to 6.9-7.1 _____

The above-described bacterium stains gram positive. Some additional characteristics are as follows:

Growth:
    at 60° C. _____ Negative.
    at 65° C. _____ Do.
    at pH 6.0 _____ Positive.
    in 10% NaCl _____ Negative.
    on nutrient agar _____ Positive.
Utilization:
    Xylose _____ Negative.
    Mannitol _____ Do.
    Lactose _____ Do.
    Arabinose _____ Do.
    Citrate _____ Positive.
    Nitrate _____ Do.
Starch hydrolysis _____ Do.
Casein hydrolysis _____ Do.
Catalase production _____ Do.
Indol production _____ Negative.
Urease production _____ Do.

The enzyme protease produced by the process of the invention is elaborated by an asporogenic Bacillus organism when said organism is grown in an aqueous nutrient medium under aerobic conditions. For large scale production of protease, submerged aerobic conditions are preferred. For the preparation of limited amounts of protease, surface cultures and bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, cornstarch, lactose, dextrin, molasses, fats, oils, and the like. Preferred nitrogen sources include cornsteep liquor, yeast, autolyzed brewer's yeast with milk solids, soybean meal, cottonseed meal, milk solids, pancreatic digest of casein, distillers' solids, animal peptone liquors, meat and bone scraps, inorganic nitrogen, fish meal, dried animal blood, and the like. Combinations of these carbon and nitrogen sources can be used advantageously. Trace metals, for example, zinc, magnesium, manganese, cobalt, iron, and the like, usually need not be added to the fermentation media since tap water and unpurified ingredients are used as media components.

Production of the protease can be effected at any temperature conducive to said growth of the microorganism, for example, between about 15° and 45° C., and preferably between 30° and 40° C. Ordinarily, optimum production of the protease is obtained in about 24 to 48 hours. The medium normally remains between pH 6 and 8 during the fermentation. The final pH is dependent, in part, on the buffers present, if any, and in part on the initial pH of the culture medium.

It is preferable to use one or more seed or inoculum stages prior to the fermentation stage of the process in order to reduce the time of the fermentation cycle. The medium for such seed stages can be similar to that utilized in the fermentation stage.

Evidence of the presence of the enzyme protease in the fermentation beer can be obtained by subjecting samples of the fermentation beer to various tests well known in the enzyme art. For example, the test described in U.S. Pat. 3,409,719, column 3, lines 53 et seq. can be used. This test method is known as the "Gelatin Viscosity Method." It comprises bringing 10 ml. of the enzyme solution into contact with 250 g. of a 14% gelatin solution at 37.5° C. for one hour. After this period of contact, the viscosity of the solution is measured with a viscosimeter and compared to a control. Another suitable assay procedure for protease is disclosed on pages 511–514 of the Journal of The American Oil Chemists' Society, vol. 46, October 1969.

The isolation of protease enzyme from the fermentation beer begins by first removing a majority of cellular materials and other insolubles by various procedures known in the art to obtain a relatively clear beer containing the protease. This operation can be performed by subjecting the whole beer to one or more of the following operations separately or in combination: flocculation (preferred), filtration, centrifugation, and the like.

Upon obtaining a clear beer containing the protease, further isolation of the protease can be accomplished by concentrating the clear beer by various procedures known in the art. For example, the clear beer can be concentrated by evaporation, ultrafiltration (preferred), precipitation with a water-miscible organic solvent or an inorganic salt, filtration, centrifugation, and the like. Suitable solvents are methyl, ethyl, or propyl alcohols, acetone, dioxane, and the like. The resulting liquid concentrate containing protease then can be used directly as an additive to detergents.

The liquid concentrate can be subjected to further processing in order to remove the remaining water, and perhaps solvent, to obtain a relatively dry, stable, solid protease preparation. For example, the protease concentrate can be subjected to one or more of the following operations separately or in combination: spray drying (preferred), freeze drying, fluidized bed drying, drum drying, prilling, spray congealing, hydrating inorganic salts, agglomerating, aggregating, and the like. These procedures are all well known in the enzyme art.

The resulting solid protease product then can be used as an additive to detergents after sizing and blending the preparation to meet various specifications.

Use of asporogenic Bacillus in the subject invention process allows a simplification of the protease isolation procedure. As disclosed above, bacterial spores in prior art processes must be significantly reduced in the protease product. The removal of such spores is a difficult, inefficient, and expensive operation. Since the process of the subject invention yields a fermentation beer substantially free of bacterial spores, the problems of prior art spore removal are not present. Viable vegetative cellular materials remaining in the fermentation beer at harvest can easily be destroyed by the use of any of a number of well-known biocides which do not affect the protease present. Biocides which can be used are the quaternary ammonium salts, for example, dodecyltrimethylammonium chloride, tetramethylammonium bromide, tetraethylammonium iodide, phenyltrimethylammonium fluoride, benzyltrimethylammonium sulfate, tricaprylmethylammonium chloride, octodecyltrimethylammonium nitrate, 1-hexadecylpyridinium chloride, benzyldimethylphenylammonium chloride, and the like. The usual range required for effective biocidal action is 0.01 to 10 g./l. of whole beer. A level of 1 g./l. is preferred. Temperature during treatment with the biocide can be from 5° to 50° C., with 30°–35° C. being the preferred range. The time of exposure to the biocide will be dependent upon the level of viable cells in the solution. A time of 30 minutes has been found to be sufficient for most solutions. Advantageously, the whole fermentation beer is treated with the biocide, though the biocide treatment can be done at any subsequent stage prior to the obtention of the final protease product. Use of the biocide at the whole fermentation beer stage has the additional desirable features of reducing the chances of secondary growth, contamination and putrefaction during the isolation of the protease.

An asporogenic strain of a Bacillus organism, which has the capability of producing high protease titers in a fermentation, can be obtained by a method of selection which is described hereinafter. This method is described with reference to the organism *Bacillus subtilis,* but the same method with modifications available to those skilled in the art can be used to select other asporogenic Bacillus organisms having the desirable characteristic of producing high protease titers.

The following examples are illustrative of the products and processes of the subject invention, but are not to be construed as limiting. All percentages are by weight and solvent by volume unless otherwise noted.

EXAMPLE 1.—Selection of asporogenic Bacillus (A) Sporulation and pigmentation conditions An agar medium which gives a good spore population with *B. subtilis* on petri dishes has the following composition:

| | | |
|---|---|---|
| Difco Nutrient Broth [1] | g | 4 |
| $MgSO_4$ | mg | 6 |
| $CaCl_2$ | mg | 555 |
| $FeCl_2 \cdot H_2O$ | mg | 1 |
| Dextrose | g | .1 |
| KCl | g | .5 |
| Difco Bacto Agar [1] | g | 15 |
| Casein | g | 5 |

Q.S. to 1 liter with distilled $H_2O$.

[1] Difco Laboratories, Detroit, Mich.

The agar medium is pipetted into 3½ inch diameter petri dishes at a level of 16 ml. per plate. After the agar has solidified the plates are dried in a 35° C. incubator. Using sterile toothpicks, the agar plates are streaked in 12 spaced droplets with a cell suspension of *B. subtilis.* The colonies develop relatively circular shapes after four days incubation at 34° C. and there are abundant spores on the salmon-colored bacterial colonies.

A similar pigmentation-sporulation agar medium can be designed for each Bacillus sp. Sporulation is more abundant on agar than in liquid media, and the resulting spore crop is much "cleaner" of medium ingredients. The time of incubation can vary between 2–6 days and the temperature needed to give optimum sporulation, depending on the Bacillus sp., can vary from 25° C. to 45° C.

(B) Spore suspension preparation

Sterile distilled water is pipetted onto the surface of the agar plates, obtained as disclosed above, and with the aid of a rubber policeman a spore and cell crop is collected. Such a crop usually contains about $1.5 \times 10^9$ spores, and $1.7 \times 10^9$ vegetative cells/ml. The suspension is filtered and washed 10 times through a $0.22\mu$ porosity Millipore filter (Millipore Filter Corporation, Bedford, Mass.) and resuspended after each filtering with a rubber policeman. The final wash is with $10^{-2}$ M phosphate buffer at pH 7.0. The total cell crop is then suspended in a $10^{-3}$ M tris-(tris(hydroxymethyl)amino methane) buffer containing 0.15 M KCl and 50 $\mu$g./ml. lysozyme at a pH of 8.33 in 45 ml. of solution. The lysozyme treatment is of one hour duration at 25° C. and destroys vegetative bacterial cells. The intact spores are washed six times with sterile distilled water. The washing procedure is necessary to remove germination inhibitors, for example, as many as 25-30 washes may be necessary with some Bacillus species. The level of lysozyme and duration of treatment may be varied as needed in order to lyse all of the vegetative cells of various Bacillus sp.

(C) Spore germination

The spore suspension, obtained as disclosed above, is heated to 80° C. for ten minutes to break dormancy. At the conclusion of the heat treatment, the spores are removed by filtration with a $0.22\mu$ Millipore filter. With the aid of a rubber policeman, the spores are suspended in a 50-ml. portion of Difco Brain Heart Infusion Broth (BHI) (Difco Laboratories, Detroit, Mich.) to which has been added 100 $\mu$g./ml. L-alanine and 100 $\mu$g./ml. adenosine. The suspension is agitated with a vortex mixer to break up spore clumps and is then incubated at 25° C. for 15 minutes. The spores are again filtered, resuspended in 50 ml. of BHI plus additives, as disclosed above, and are incubated at 25° C. The spore suspension is separated with a $0.22\mu$ filter and the spores are then resuspended in a 50-ml. portion of BHI plus levels of 100 $\mu$g./ml. L-alanine, 100 $\mu$g./ml. adenosine and 100 $\mu$g./ml. chloramphenicol. Chloramphenicol is added to prevent vegetative outgrowth of the germinated spores. Other antibiotics that could be used are erythromycin, 5-fluorouracil, and tetracycline. The suspension is refrigerated to await mutation treatment.

The spore germination step, disclosed above, may vary between individual Bacillus species. The heat treatment time and temperature can vary from 10-60 minutes and from 60-100° C., respectively, and is easily established by one skilled in the art. The use of BHI medium for germination is usually effective, although the additives and/or levels necessary for optimum germination can vary. Brief periods are necessary between washing and resuspending in fresh medium as germination inhibitors are continually being released by germinating spores into the surrounding medium. Accordingly, the number of fractional germination cycles (resuspensions in fresh medium) can vary among the species of Bacillus.

(D) Mutation

The refrigerated suspension (about 50 mls.) of germinated spores obtained as disclosed above, is treated with 50 $\mu$g./ml. of N-methyl-N'-nitro - N - nitrosoguanidine (NTG) plus 5 ml. of pH 5.5 acetate buffer. Samples of the treated spore suspension are removed after 10, 22, and 34 minutes and filtered with $0.2\mu$ porosity Nalge filter (Nalge Company, Division of Ritter Pfaudler Corporation, Rochester, N.Y.), washed and then stored in cold 0.1 M phosphate buffer at pH 7.1.

The mutation treatment of germinated spores of other species of Bacillus can be accomplished with NTG, or with other chemical mutagens well known in the mutation art, for example, acriflavine, acridine orange, nitrous oxide, 5-bromo-uracil, phenol, 4-quinoline-1-oxide, and $\beta$-propiolactone, or with ionizing radiations. For effective mutation, the dosage levels and duration of treatment can be expected to vary with different Bacillus species. The buffer used for washing and storage to retain maximum viability after mutation also can vary. It is within the skill of those in the mutation art to make the necessary adjustments by routine procedures in view of the above disclosure.

(E) Selection

The sporulating strains of *B. subtilis*, disclosed above, give very dark salmon pigmentation after 3-4 days incubation at 34° C. on the medium listed below, but virtually no pigmentation is found with oligosporogenous or asporogenous isolates.

Differential pigmentation-sporulation agar for *Bacillus subtilis*

| | | |
|---|---|---|
| KCl | g. | 5 |
| L-tyrosine | mg. | 20 |
| L-tryptophan | mg. | 20 |
| MnCl$_2$ | mg. | 2 |
| MgCl$_2$ | mg. | 200 |
| FeCl$_2 \cdot$4H$_2$O | mg. | 35 |
| CaCl$_2$ | mg. | 200 |
| Difco nutrient agar | g. | 23 |

Q.S. to 1 liter with distilled H$_2$O
Adjust pH to 6.9-7.1

The above medium is a good selection medium for *B. subtilis* and *B. cereus*. An agar medium similar to this that will give abundant pigmentation with the "wild" type of an orange or salmon or brown color, and that will usually fail to produce noticeable pigmentation with asporogenous and oligosporogenous mutants can be selected for each Bacillus strain. The incorporation of elastin or casein into this same agar will usually give a secondary selection aid for a test of protease production of the sporulation mutants, i.e. the protease producing colonies will be surrounded by a clear zone on the protein agar.

It is to be understood that the process of the subject invention, though described in detail with particular reference to the novel microorganism *Bacillus subtilis*, NRRL B-3907, is not limited to this particular microorganism or to microorganisms fully described by the cultural characteristics disclosed herein. It is intended that this invention also include other strains or mutants of the said microorganism which can be produced by procedures well known in the art, for example, by subjecting the novel microorganism to X-ray or ultraviolet radiation, nitrogen mustard, phage exposure, and the like.

As is true in microbiological processes generally, the bacterial culture for producing protease should not be transferred (recultured) too frequently as this may result in a lower protease producing culture.

EXAMPLE 2.—PREPARATION OF PROTEASE BY ASPOROGENIC BACILLUS (A) Fermentation

A suspension of *Bacillus subtilis*, NRRL B-3907, is used to inoculate 100 ml. of a primary seed medium contained in a 1 l. conical flask. The medium is sterilized at 121° C. for 30 minutes and the cooled to 28° C. before inoculation. The primary seed medium consists of 37 g./l. of Brain Heart Infusion Broth. Defoamer FD-104 (supplied by Drew Chemical Co.) is added to the medium at a level of 0.5 ml./l.

The inoculated primary seed medium flask is incubated on a reciprocating shaker (90 strokes/minute) in a 28° C. shaker room. Incubation is for 12 hours at which time the *B. subtilis* cells are in an active replicating stage of growth.

The primary seed culture, disclosed above, is used as inoculum for a secondary seed tank having an operating volume of 250 liters. The medium of the secondary seed has the same nutrient composition as the primary seed medium. Prior to inoculation of the secondary seed, the medium is sterilized at 121° C. for 30 minutes, then cooled to 28° C.

The inoculated secondary seed tank is aerated with sterile air at a flow rate of 200 standard liters/minute and stirred at an agitator speed of 280 r.p.m. for 16 to 18 hours.

The secondary seed, discussed above, is used to inoculate a fermentation tank containing medium consisting of the following ingredients:

| | |
|---|---|
| Starch | g-- 50 |
| Soy flour | g-- 20 |
| Casein | g-- 10 |
| $Na_2HPO_4$ | g-- 3.3 |
| Defoamer FD-104 [1] | ml-- 0.5 |
| Tap water to q.s. to 1 l. | |

[1] Supplied by Drew Chemical Company.

Sodium hydroxide is added to adjust the pH to 10.

The fermentation medium is sterilized at 121° C. for 60 minutes, and then cooled to 35° C. before inoculating it with 5% by volume, of the above-disclosed secondary seed. For a 5,000 liter fermentation, the post-sterilization volume is 4,750 liters and the seed inoculum volume is 250 liters. After inoculation, the fermentation temperature is controlled at 35° C., the air flow rate is 95 standard cubic ft./min., and agitation speed is 195 r.p.m. Antifoam, as disclosed above, is added on demand to control foaming. Fermentation is continued until the desired concentration of protease enzyme is reached. The level of protease present in the fermentation beer can be determined by a protease assay as described previously. Generally, the fermentation is complete in about 24–48 hours.

The change in protease titer of a fermentation, as described above, is as follows:

| Fermentation time (hrs.) | Relative protease activity (percent) |
|---|---|
| 24 | 68 |
| 28 | 84 |
| 36 | 100 |

(B) Isolation of the protease from a fermentation beer

To a protease fermentation whole beer, as described above, is added 0.1% of dodecyltrimethylammonium chloride. The whole beer is then transferred from the fermenter to a holding tank, a flocculent is added, for example, Drew Chemical's Drewfloc 412 or Rohm and Haas' C–5, in 0.1 to 4.0% by volume, and the beer is then filtered and polished with the addition of filter aids such as Johns-Manville's Standard Super-Cel in 0.1 to 10% by weight to yield a sparkling clear beer containing protease. The clear beer is concentrated by ultrafiltration using an "Osmotik" processor built by Havens International, San Diego, Calif., to about 5–8% of the original filtration harvest volume. This protease concentrate contains about 65–85% of the original harvest protease and can be used directly as an additive to detergents. Further, this protease concentrate can be spray dried to yield a substantially stable dry preparation of protease which is substantially spore free. As disclosed above, this preparation can be used in various environments for which proteases have been found useful.

EXAMPLE 3

Upon substituting the B. subtilis culture used in Example 2 with another Bacillus culture, as selected by the procedure disclosed in Example 1, there is produced a fermentation beer containing protease and being substantially free of viable bacterial spores. This beer is processed by the procedures disclosed in Example 2 to give a substantially spore-free preparation of protease.

PROPERTIES OF ALKALINE PROTEASE

Immunological properties [1]

Cross reacts with antisera to subtilopeptidase types VIII and Carlsberg on Ouchterlony double diffusion agar plates.

Esterase activity/protease activity [2] _____ 5.61

Type alkaline protease—A

Note.—Alkaline proteases may be separated into two types, A and B, based on their protease to esterase activity ratios.

pH Stability, maximum _____ 9.0–10.0
pH Optimum _____ 9.6

Effects of NTA (nitrotriacetic acid) and STP (sodium tripolyphosphate) on stability at pH 9.0

| | Percent |
|---|---|
| 10 min. (control); activity | 100 |
| 50 min. (no addition); activity | 65 |
| 50 min., 0.1% NTA; activity | 75 |
| 50 min., 0.1% STP; activity | 68 |

[1] Determined by procedure disclosed in article by Ouchterlony, O., Progress in Allergy, 5, 1–78 (1958), S. Karger, Basel/New York (Publisher).
[2] Protease activity determined by procedure disclosed on p. 215 et seq. of article by Keay, L., et al., Biotechnology and Bioengineering, vol. 12, pp. 213–249 (1970). Esterase activity determined by hydrolysis of $10^{-3}$ tosylarginine methyl ester dissolved in 0.1 M tris HCl buffer.

We claim:
1. A process for preparing the enzyme protease which comprises culturing an asporogenic bacterium, selected from the genus Bacillus, in an aqueous nutrient medium under aerobic conditions.

2. A process, according to claim 1, wherein the asporogenic Bacillus bacteria is selected from the species *Bacillus subtilis*.

3. A process, according to claim 1, wherein the *Bacillus subtilis* bacteria has the identifying characteristics of NRRL B–3907, and mutants thereof.

4. A process for preparing the enzyme protease which comprises culturing an asporogenic bacterium, selected from genus Bacillus, in an aqueous nutrient medium containing a source of assimilable carbohydrate and assimilable nitrogen, under aerobic conditions until substantial protease activity is imparted to said medium, and recovering the protease so produced.

5. A process, according to claim 4, wherein the recovery of the protease from the fermentation medium comprises:
(a) adding an effective biocidal amount of a quaternary ammonium salt to the fermentation beer;
(b) adding to the beer an effective flocculating amount of a flocculent;
(c) filtering and polishing the beer to obtain a clear beer containing protease; and
(d) concentrating said clear beer to obtain a liquid concentrate containing protease which is substantially free of viable Bacillus spores.

6. A process, according to claim 5, wherein the recovery of the protease from the fermentation medium comprises:
(a) adding an effective biocidal amount of a quaternary ammonium salt to the fermentation beer;
(b) adding to the beer an effective flocculating amount of a flocculent;
(c) filtering and polishing the beer to obtain a clear beer containing protease;
(d) concentrating said clear beer to obtain a liquid concentrate containing protease; and
(e) spray drying said concentrate to obtain a substantially stable dry preparation of protease which is substantially free of viable Bacillus spores.

7. A fermentation beer, obtained by the process as described in claim 1, said beer containing the enzyme protease, and said beer being substantially free of viable Bacillus spores.

8. A process for selecting asporogenic bacteria, selected from the genus Bacillus which comprises:
(a) inoculating and growing Bacillus bacteria in a sporulation agar;
(b) removing the bacterial cells from said agar and treating the cells with an effective amount of lysozyme to destroy vegetative cells;
(c) washing the remaining Bacillus spores with sterile distilled water;
(d) germinating said washed Bacillus spores by suspending said spores in a spore germinating medium;
(e) mutating said germinated spores;
(f) plating said mutated spores on a differential pigmentation-sporulation agar; and
(g) selecting non-pigmented asporogenous and oligosporogenous Bacillus mutants therefrom.

9. A process, according to claim 8, wherein N-methyl-N'-nitro-N-nitrosoguanidine is used to mutate the germinated spores.

References Cited
UNITED STATES PATENTS
3,623,955  11/1971  Keay _____ 195—66 R
3,031,380  4/1962  Minagawa et al. ____ 195—66 R

FOREIGN PATENTS
2,018,451  10/1970  Germany _____ 195—66 R

LIONEL M. SHAPIRO, Primary Examiner

U.S. Cl. X.R.

195—66 R; 252—DIG. 12